L. Keiler.
Calculating-Machine.

Nº 73449. Patented Jan. 21, 1868.

Witnesses
Henry Mitchell
H. W. Smith

Levi Keiler
By his Atty
J. Franklin Rugart

United States Patent Office.

LEVI KEILER, OF CATAWISSA, PENNSYLVANIA.

Letters Patent No. 73,449, dated January 21, 1868; antedated January 6, 1868.

IMPROVEMENT IN CALCULATING-MACHINES.

The Schedule referred to in these Letters Patent and making part of the same.

TO ALL WHOM IT MAY CONCERN:

Be it known that I, LEVI KEILER, of Catawissa, Columbia county, State of Pennsylvania, have invented an Improved Calculating-Machine; and I do hereby declare the following to be an exact description thereof, reference being had to the accompanying drawings, and to the letters of reference marked thereon, making a part of this specification, in which—

Figure 1:
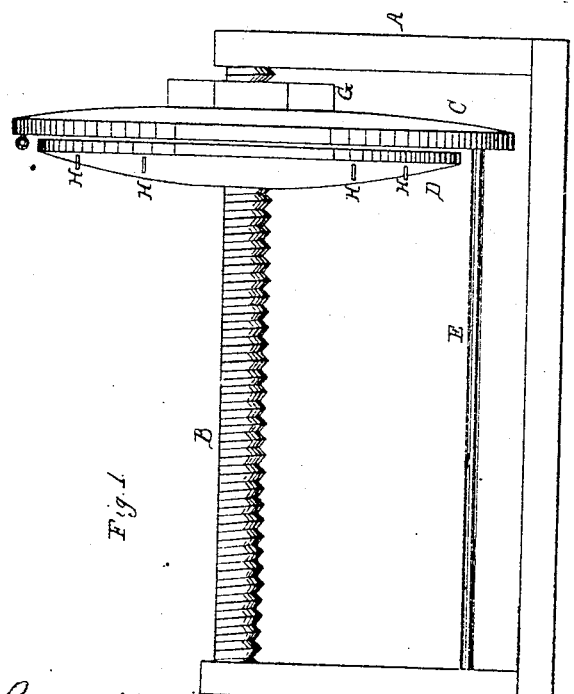

Figure 1 is a side elevation of the calculating-machine.

Figure 3:
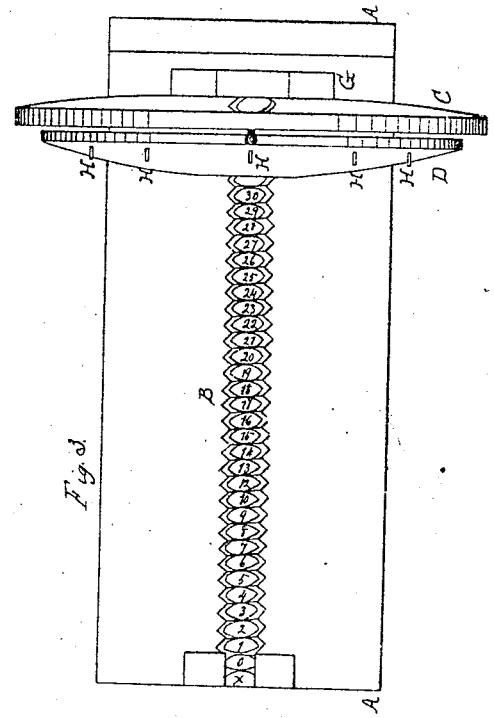
Figure 2:
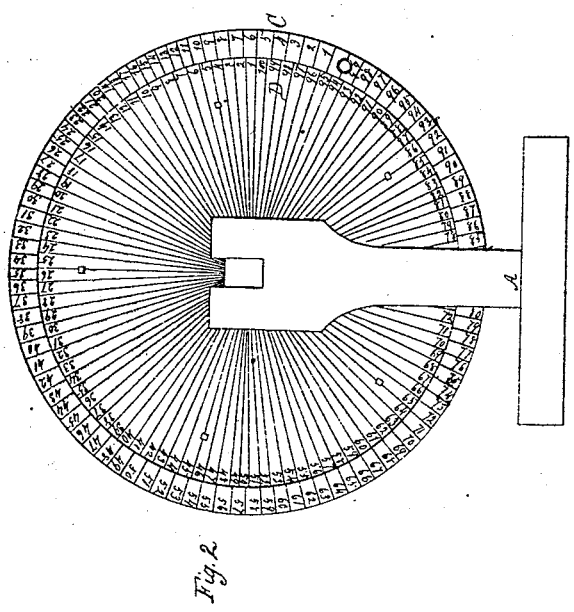

Figure 2 an end view.

Figure 3 a top view.

The nature of my invention consists of two wheels or disks, the larger being numbered near the edge from 0 to 99, and the smaller from 1 to 30. The screw-shaft, on which the disks hang, is numbered from 1 to 30, or one figure on every round of the thread. The smaller or revolving disk has a hub or centre projecting on the back side, fitting into a corresponding hole in the larger disk, but loosely, allowing it to turn in it; and lastly, a washer or nut is put on the projecting centre of the smaller disk and on the back of the larger, to secure the latter in its place, but not in so close contact with it as to prevent the free turning of the smaller disk. A wire bar runs through the lower edge of the larger disk, to hold it in a vertical position while the other disk turns.

A represents the frame that supports the machine; B, the screw-shaft, on which the disks C and D hang and operate; E, the wire bar, that holds the larger disk, C; G is the nut that is attached to the centre of the smaller disk D, but operates behind the larger disk C; H are five small projecting pins, by which the smaller disk D is revolved.

To operate the machine, turn the disks C and D to 0 on the screw-shaft B, with No. 1, on revolving disk D, at 0 on the disk C. Then, suppose you wish to add the sums 15, 18, 20, 30, and 45, turn 15 to 0, then turn 15 to 18, and 33 will be at 0; turn 33 to 20, and 53 will be there; turn that to 30, and 83 will be seen, which, turned to 45, will show 1 on the shaft B and 28 at 0, and 28 at 0 on the disk D, and so on.

There is no slip or lost motion about this machine by which it can gain or lose. The disks may be made of any material, metal, wood, or pasteboard. The machine can be used perpendicularly as well as horizontally.

I do not claim the numbering of two disks in opposite directions, as that has been done before; but

What I claim as my invention, and desire to secure by Letters Patent, is—

The two disks, C and D, graduated screw-shaft B, and guide-bar E, when arranged, combined, and operated as herein described and for the purposes set forth.

LEVI KEILER.

Witnesses:
M. M. BROBST,
JOHN JAMESON.